(12) United States Patent
Chen et al.

(10) Patent No.: US 12,079,116 B2
(45) Date of Patent: Sep. 3, 2024

(54) NETWORK BASED TESTING OF MOBILE DEVICE KERNELS SYSTEM AND METHOD

(71) Applicant: Visa International Service Association, San Francisco, CA (US)

(72) Inventors: Yuexi Chen, Foster City, CA (US); Hendy Wong, San Ramon, CA (US); Sarah Jane Galamay, Danville, CA (US)

(73) Assignee: Visa International Service Association, San Francisco, CA (US)

( * ) Notice: Subject to any disclaimer, the term of this patent is extended or adjusted under 35 U.S.C. 154(b) by 24 days.

(21) Appl. No.: 17/797,537

(22) PCT Filed: Feb. 8, 2021

(86) PCT No.: PCT/US2021/017040
§ 371 (c)(1),
(2) Date: Aug. 4, 2022

(87) PCT Pub. No.: WO2021/162973
PCT Pub. Date: Aug. 19, 2021

(65) Prior Publication Data
US 2023/0052559 A1 Feb. 16, 2023

Related U.S. Application Data

(60) Provisional application No. 62/972,530, filed on Feb. 10, 2020.

(51) Int. Cl.
*G06F 11/36* (2006.01)
(52) U.S. Cl.
CPC ...... *G06F 11/3688* (2013.01); *G06F 11/3692* (2013.01)

(58) Field of Classification Search
CPC ... G06F 9/44; G06F 9/45; G06F 11/00; G06F 11/36; G06F 11/3688; G06F 11/3692; H04M 1/24
See application file for complete search history.

(56) References Cited

U.S. PATENT DOCUMENTS 5,136,590 A 8/1992 Polstra et al.
10,108,532 B1 10/2018 Looney
(Continued)

FOREIGN PATENT DOCUMENTS

CN 105068937 A 11/2015
CN 106557411 A 4/2017
(Continued)

OTHER PUBLICATIONS

WIPO English translation version CN106557411 (Year: 2015).*
(Continued)

*Primary Examiner* — Hanh Thi-Minh Bui
(74) *Attorney, Agent, or Firm* — Kilpatrick Townsend & Stockton LLP

(57) ABSTRACT

A method is disclosed and includes determining a test plan to test a kernel on a mobile device, and determining an interaction input message according to the test plan, the interaction input message comprising first data. The method also includes transmitting the interaction input message comprising the first data to the mobile device over a network-based communication channel. The kernel in the mobile device generates the interaction output message in response to receiving the interaction input message. The method also includes receiving, from the mobile device, the interaction output message comprising second data from the mobile device over the network-based communication channel, and determining if the interaction output message is consistent with the test plan.

20 Claims, 4 Drawing Sheets

(56) References Cited

U.S. PATENT DOCUMENTS

2016/0012465 A1* 1/2016 Sharp ............... G06Q 20/321
                                                        705/14.17
2019/0347189 A1   11/2019 Chen et al.
2022/0091949 A1    3/2022 Chen et al.

FOREIGN PATENT DOCUMENTS

KR      20130097563 A     9/2013
WO   WO-2017092430 A1 *  6/2017    ............... G06F 3/01

OTHER PUBLICATIONS

"JoinPAY, A Modular Fintech Platform", By MST, Multisystem Technologies, Available online at https://join-pay.com/images/documents/joinpay_presentation_web_eng.pdf, 18 pages.

Gnatyk, "Microservices Vs Monolith: Which Architecture Is the Best Choice for Your Business?", Document retrieved from: https://www.n-ix.com/microservices-vs-monolith-which-architecture-best-choice-your-business/#:~:text=While%20a%20monolithic%20application%20is,as%20perform%20the%20specific%20functions, Oct. 3, 2018, 6 pages.

PCT/US2021/017040, "International Search Report and Written Opinion", Jun. 4, 2021, 11 pages.

EP21754625.8 , "Extended European Search Report", Feb. 5, 2024, 10 pages.

* cited by examiner

NETWORK BASED TESTING OF MOBILE DEVICE KERNELS SYSTEM AND METHOD

CROSS-REFERENCE TO RELATED APPLICATIONS

This application is a National Stage of International Application No. PCT/US2021/017040, filed Feb. 8, 2021, which claims priority to U.S. Provisional Application No. 62/972,530, filed on Feb. 10, 2020, which are all herein incorporated by their reference.

BACKGROUND

When testing contactless access devices such as contactless terminals (e.g., transit gate terminals, point of sale terminals, kiosks, etc.), contactless probes or reprogrammable portable devices (e.g., a reprogrammable card) are used. To complete a test plan with respect to an access device, a contactless probe or reprogrammable portable device is manually tapped to an access device hundreds or even thousands of times. Even if the tapping process is automated, the testing process is still very time consuming, since the physical act of tapping the probe or the reprogrammable portable device to the access device needs to take place. This is a problem when access devices receive frequent updates and undergo frequent testing.

This problem is compounded when the access device to be tested cannot be easily reached by a technician. For example, there may be thousands of access devices within a specific geographic location. It is impractical and inconvenient for a human technician to travel to teach and every access device to test them.

Further, mobile devices such as cellular phones are increasingly being used as access devices. For example, resource providers can use mobile devices such as cellular phones to scan users' access cards before allowing them to obtain access to resources provided by the resource providers. It is impractical to frequently test each and every potential mobile device that could be used as an access device using existing testing methods.

Embodiments of the disclosure address this problem and other problems individually and collectively.

SUMMARY

One embodiment is related to a method comprising: determining, by a test computer, a test plan to test a kernel on a mobile device; determining, by the test computer, an interaction input message according to the test plan, the interaction input message comprising first data; transmitting, by the test computer, the interaction input message comprising the first data to the mobile device over a network-based communication channel, wherein the kernel in the mobile device generates the interaction output message in response to receiving the interaction input message; receiving, by the test computer from the mobile device, the interaction output message comprising second data from the mobile device over the network-based communication channel; and determining, by the test computer, if the interaction output message is consistent with the test plan.

Another embodiment is related to a test computer comprising: a processor; and a computer-readable medium coupled to the processor, the computer readable medium comprising instructions executable by the processor, to cause the test computer to: determine a test plan to test a kernel on a mobile device; determine an interaction input message according to the test plan, the interaction input message comprising first data; transmit the interaction input message comprising the first data to the mobile device over a network-based communication channel, wherein the kernel in the mobile device generates the interaction output message in response to receiving the interaction input message; receive, from the mobile device, the interaction output message comprising second data from the mobile device over the network-based communication channel; and determine, if the interaction output message is consistent with the test plan.

Another embodiment includes a method comprising: receiving, by a mobile device comprising a kernel from a test computer, an interaction input message comprising first data over a network-based communication channel; generating, by the kernel in the mobile device, an interaction output message in response comprising second data to receiving the interaction input message; and transmitting, by the mobile device, the interaction output message to the test computer over the network-based communication channel.

Further details regarding embodiments of the disclosure can be found in the Detailed Description and the Figures.

DETAILED DESCRIPTION

Figure 1:
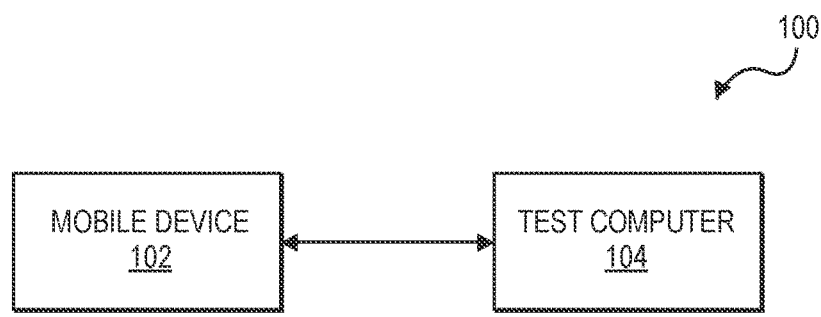
FIG. 1 shows a block diagram a testing system according to embodiments.

Prior to discussing embodiments of the disclosure, some terms can be described in further detail.

A "user" may include an individual or a device that uses something.

A "portable device" may include a device that can be easily transported. For example, a portable device be used by a user can interact with an access device in order to conduct an interaction. Examples of portable devices include payment devices, membership devices, access cards, identification devices, etc.

A "mobile device" can include a device that can be carried by a user. Examples of mobile devices can include a smartphone, a tablet computer, etc. In some embodiments, a mobile device can comprise an interaction application and a kernel. In some embodiments, a mobile device can be a mobile access device. A mobile access device can be used by a resource provider or a person working for a resource provider to confirm that a user that uses a portable device has authority to obtain access to a resource (e.g., a location, good, service, data, etc.) provided by the resource provider (e.g., a transit operator, a venue operator, a merchant, etc.).

A "test computer" can include a computer that can determine whether or not objectives are being met. In some embodiments, a test computer can determine whether or not objectives are being met by performing a test (e.g., an interaction test). In some embodiments, a test computer can transmit data to a mobile device to determine whether or not the mobile device is operating correctly. This can be based on, for example, a response including second data from the mobile device that is in response to first data transmitted by the test computer to the mobile device.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which devices can interact to facilitate a payment.

"Interaction data" can include data related to an interaction. In some embodiments, interaction data can be transaction data. Transaction data can comprise a plurality of data elements with data values associated with a transaction. In some embodiments, interaction data can include identifiers, credentials, amounts, dates, times, etc.

An "interaction input message" may be a communication received during an interaction. For example, a message sent by an mobile device may be an interaction input message for a receiving portable device. One example of an interaction input message can include an APDU (application protocol data unit) command.

An "interaction output message" may be a communication sent during an interaction that is responsive to an interaction input message. One example of an interaction output message can include an APDU response sent by a portable device, in response to receiving an APDU command.

A "test interaction" may be an investigative interaction. In some embodiments, a test interaction may be conducted to determine information about how an interaction system is functioning. For example, different test interactions can be designed to determine whether or not interactions will be processed correctly when initiated by different types of portable devices. A test interaction can involve sending certain types of information during an interaction communication session, to an mobile device, in order to test how the information is processed. Some test interactions can be designed to check for errors in interaction processing. For example, some test interactions can check the response from the mobile device when a test computer provides incorrect information for an interaction. A properly functioning mobile device would provide a predicated response (e.g., a certain error message) after receiving the incorrect information.

An "interaction report" may include information related to one or more prior interactions. An interaction report can have a description of how a message in an interaction was processed. For example, an interaction report can have information that was sent and received, and whether the interaction was successful. An interaction report can also include notes about problems, missing information, delays, or other issues that took place during the interaction.

An "authorization request message" may be an electronic message that requests authorization. In some embodiments, the authorization request message may be an electronic message that requests authorization for an interaction. In some embodiments, the authorization request message may be sent to a network processing computer and/or an issuer of a payment card to request authorization for an interaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer.

An "authorizing entity" may be an entity that authorizes a request. Examples of authorizing entities may include an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Embodiments allow for network based testing of mobile device kernels in mobile devices such as smartphones. The mobile device kernels in the mobile devices may be in applications on the mobile devices. The mobile device kernels may include code for basic functions for the applications that contain or are associated with the kernels For example, an application on a mobile device may be an acceptance application that allows the mobile device to accept or process data from an access card or payment card. The kernel may comprise code for the primary interactions (e.g., message processing) that would be performed by the acceptance application.

Embodiments can use network based APDU (application protocol data unit) transmissions to automate the kernel testing process. Embodiments of the invention do not use a contactless probe or reprogrammable contactless device when testing an interaction application (and its kernel) on a mobile device. Using embodiments of the invention, thousands of test cases can be executed in a fully automated and continuous manner, without the need for human or machine to physically tap a probe or a reprogrammable card to a mobile device. In embodiments of the invention, the mobile devices to be tested can be located anywhere in the world and humans do not need to travel to them to test them.

FIG. 1 shows a system 100 according to embodiments. The system 100 comprises a mobile device 102 and a test computer 104. The mobile device 102 and the test computer 104 can be in operative communication with each other through a communication network.

Messages between the mobile device 102 and the test computer 104 in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The mobile device 102 can be any suitable device. For example, the mobile device 102 can be a commercially available smartphone. The mobile device 102 can include an interaction application (e.g., a tap-to-phone acceptance application) that can facilitate in a user performing an interaction (e.g., a transaction, a data transfer, etc.). In some embodiments, the interaction application can comprise a kernel and a virtual portable device (e.g., a virtual payment card).

The test computer 104 can include a server computer. The test computer 104 can include, for example, a test tool comprising a test engine and a plurality of test plans. The test computer 104 can test whether or not a mobile device correctly generates data, transmits data, processes data, performs interactions, etc.

Figure 2:
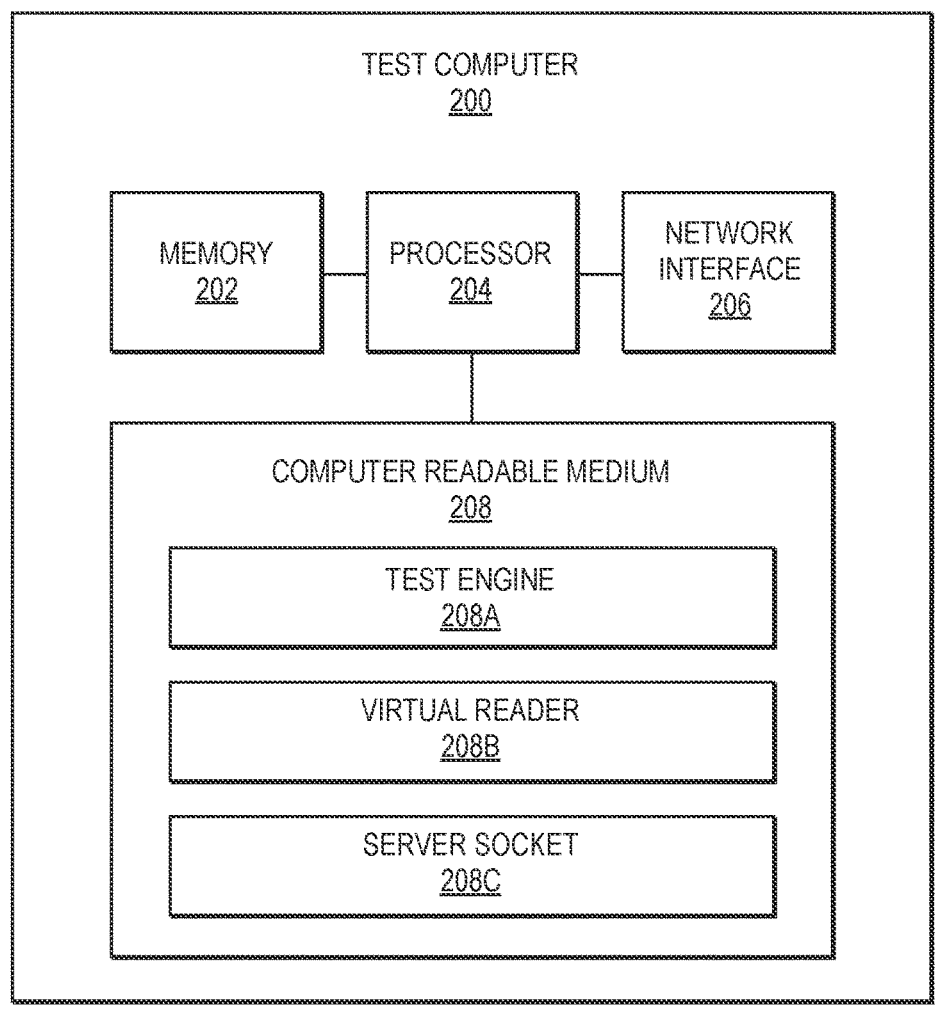
FIG. 2 shows a flow diagram illustrating a mobile device according to embodiments.

FIG. 2 shows a block diagram of a test computer 200 according to embodiments. The exemplary test computer 200 may comprise a processor 204. The processor 204 may be coupled to a memory 202, a network interface 206, and a computer readable medium 208. In some embodiments, the test computer 200 may be in operative communication with a database (not shown in FIG. 2).

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store any suitable data related to interactions and/or test interactions, cryptographic keys, etc.

The computer-readable medium 208 coupled to the processor 208, the computer-readable medium 208 comprising instructions executable by the processor, to cause the test computer to: determine a test plan to test a kernel on a mobile device; determine an interaction input message according to the test plan, the interaction input message comprising first data; transmit the interaction input message comprising the first data to the mobile device over a network-based communication channel, wherein the kernel in the mobile device generates the interaction output message in response to receiving the interaction input message; receive, from the mobile device, the interaction output message comprising second data from the mobile device over the network-based communication channel; and determine, if the second data in the interaction output message is consistent with the test plan.

The computer readable medium 208 may also comprise a test engine 208A, a virtual reader 208B, and a server socket 208C.

The test engine 208A may comprise code for generating or selecting tests, and executing commands or generating messages associated with those tests. The tests to be performed may each comprises a set of messages with commands or data, and a corresponding response set of messages or data. In some embodiments, the test engine 208A and the processor 208 can send an interaction input message to a kernel to be tested, and can receive an interaction output message from the kernel. The interaction output message may include data that may be indicative of an expected result in a scenario where the kernel satisfies the test. If the interaction output message includes data that is not indicative of an expected result, then the kernel may not satisfy the test. The test engine 208A and the processor 204 may also evaluate whether the interaction output message is received in the manner or the time-frame that is expected by the test engine 208A. For example, if the interaction output message is received from a kernel after a predetermined time from when the interaction input message was first transmitted to the kernel, then the test engine 208A and the processor 204 may determine that the kernel did not satisfy the test.

The virtual reader 208B may also include code for simulating the function of a reader in an access device. The virtual reader 208B and the processor 208B can simulate the function of a reader that would be present in an access device such as a functioning access terminal. For example, messages from the test engine 208A can be APDU messages that might be produced by an access card (e.g., in an NFC data format) and those messages may be received by the virtual reader 208B in the test computer 200. The virtual reader 208B and the processor 204 can behave like a real reader in a real access device, and can interpret those messages, and convert them to a network-based communication protocol such as a TCP/IP protocol. Once the messages are in the network-based communication protocol, they may be transmitted by the test computer 200 to the mobile device to be tested over a communications network using the network-based protocol.

The server socket 208C may comprise code for listening and responding to communications from a client over a network communications network. The server socket 208C can be a server application that listens to a specific port waiting for connection requests from a client. When a connection request arrives, the client and the test computer 200 establish a dedicated connection over which they can communicate. During the connection process, the client is assigned a local port number, and binds a socket to it. The client talks to the test computer 200 by writing to the socket and gets information from the test computer 200 by reading from it.

The network interface 206 may include an interface that can allow the test computer 200 to communicate with external computers. The network interface 206 may enable the test computer 200 to communicate data to and from another device (e.g., the mobile device 102, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
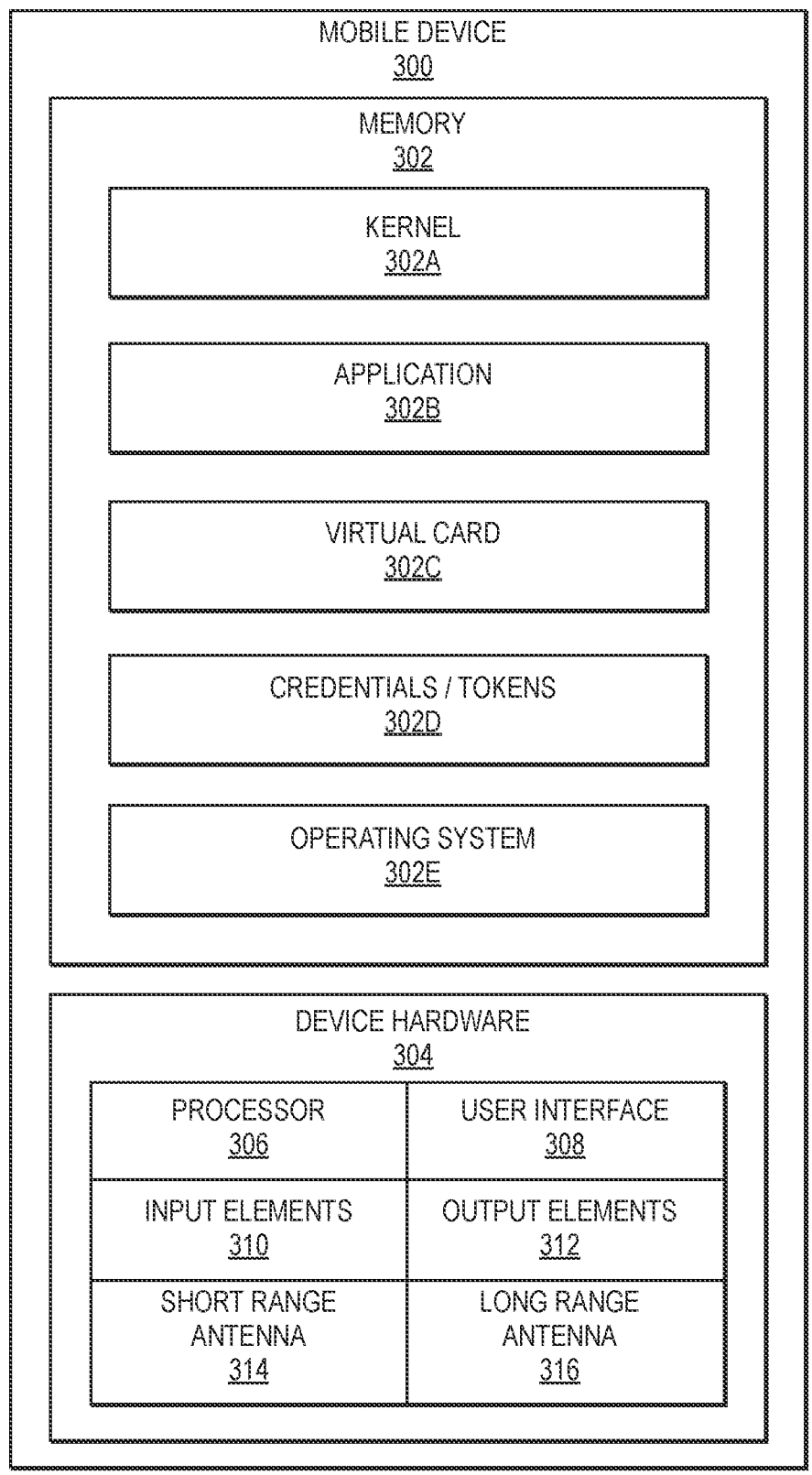
FIG. 3 shows a block diagram of components of a test computer according to embodiments.

FIG. 3 illustrates a mobile communication device 300 according to an embodiment. Mobile communication device 300 may include device hardware 304 coupled to a system memory 302 which may include a computer readable medium 302.

Device hardware 304 may include a processor 306, a short range antenna 314, a long range antenna 316, input elements 310, a user interface 308, and output elements 312 (which may be part of the user interface 308). Examples of input elements may include microphones, keypads, touchscreens, sensors, etc. Examples of output elements may include speakers, display screens, and tactile devices. The processor 306 can be implemented as one or more integrated circuits (e.g., one or more single core or multicore microprocessors and/or microcontrollers), and is used to control the operation of mobile communication device 300. The processor 306 can execute a variety of programs in response to program code or computer-readable code stored in the system memory 302, and can maintain multiple concurrently executing programs or processes.

The long range antenna 316 may include one or more RF transceivers and/or connectors that can be used by mobile communication device 300 to communicate with other devices and/or to connect with external networks. The user interface 308 can include any combination of input and output elements to allow a user to interact with and invoke the functionalities of mobile communication device 300. The short range antenna 314 may be configured to communicate with external entities through a short range communication medium (e.g. using Bluetooth, Wi-Fi, infrared, NFC, etc.). The long range antenna 314 may be configured to communicate with a remote base station and a remote cellular or data network, over the air.

The system memory 302 can be implemented using any combination of any number of non-volatile memories (e.g., flash memory) and volatile memories (e.g. DRAM, SRAM), or any other non-transitory storage medium, or a combination thereof media. The system memory 302 may store computer code, executable by the processor 306, for performing any of the functions described herein. For example, the system memory 302 may comprise a computer readable medium comprising code, executable by the processor 306, for implementing a method comprising: receiving, from a test computer, an interaction input message comprising first data over a network-based communication channel; generating an interaction output message in response to receiving the interaction input message; and transmitting the interaction output message to the test computer over the network-based communication channel.

The system memory 302 may also store a kernel 302A, an application 302B, a virtual device such as a virtual card 302C, credentials/tokens 302D, and an operating system 302E.

The kernel 302A may be a contactless kernel. The kernel 302A could be within the application 302B or external to it. It may provide the basic functionality for the application 302B. For example, the kernel 302A may provide code for certain responses that are produce or actions that are performed in response to messages that are received by the kernel 302A.

The application 302B may be an interaction application such as a contactless application. The contactless application can be a contactless acceptance application, which allows the mobile device 300 to behave like an access device that can receive and process data from a contactless portable device such as a contactless card (e.g., a contactless payment card). The acceptance device could be a POS terminal, a transit terminal, a data access terminal, or the like. The application 302B can include code for reading and processing data from portable devices, generating authorization request messages from data received from portable devices, transmitting authorization request messages to authorizing entity computers, and receiving and processing authorization response messages from authorizing entity computers The virtual card 302C may comprise code to simulate a function of a contactless card in software. The virtual card 302C and the processor 306 can behave like the previously described physical reprogrammable card or a probe. The virtual card 302C and the processor 306 can receive messages from the test computer in a network-based protocol and then convert them to an APDU message format that would be compatible with NFC data transmissions.

System memory 302 may also store credentials and/or tokens 302D. Credentials may also include information identifying the mobile communication device 300 and/or the user of the mobile communication device 300. Examples of credentials may include a public key associated with the mobile communication device 300 and/or a user of the mobile communication device 300, a digital signature (e.g., the public key of the mobile communication device 300 signed by a key of the authentication system), payment credentials, biometric data (e.g., biometric samples or templates), etc.

Figure 4:
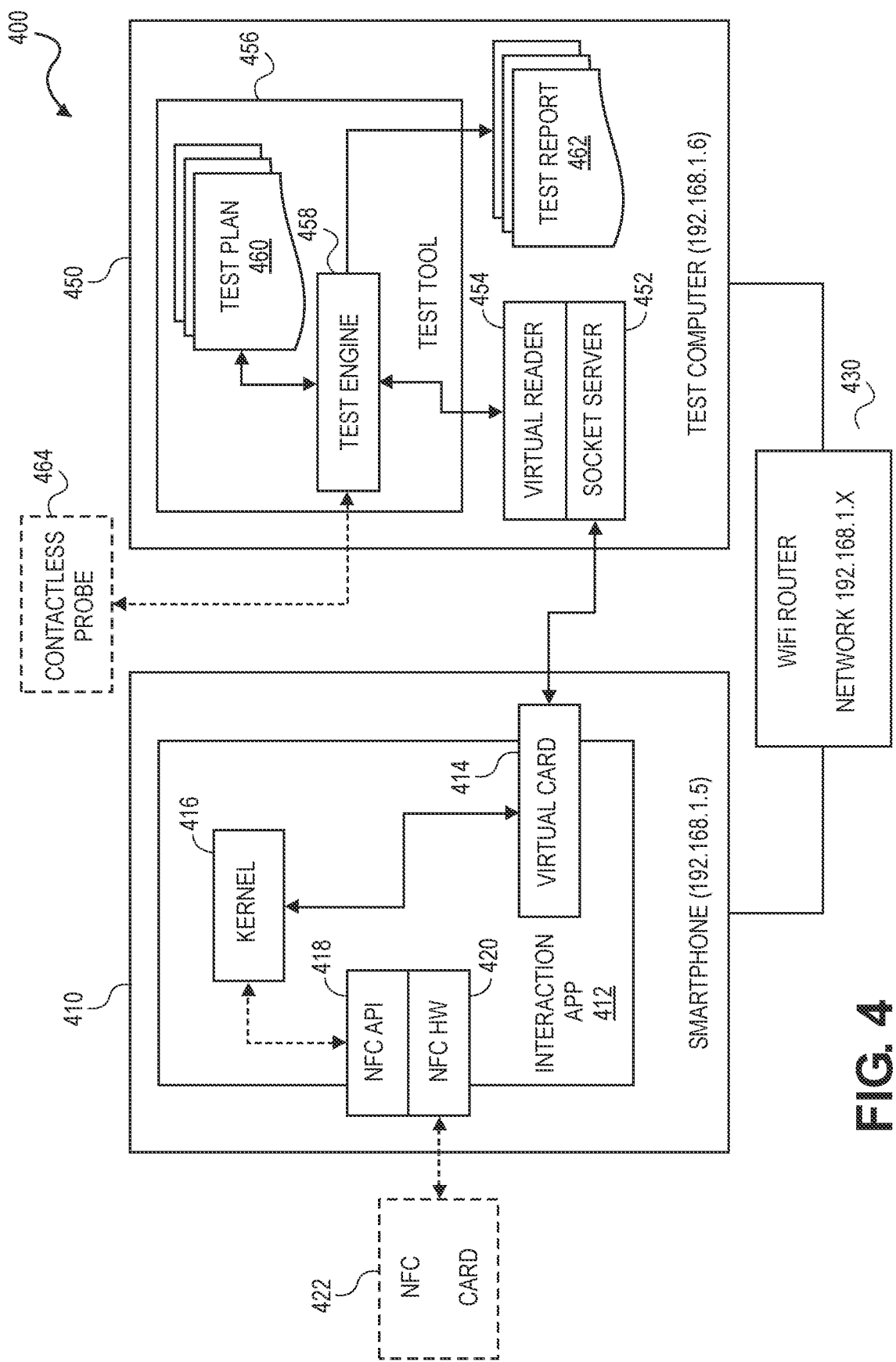
FIG. 4 shows block diagram of components of a test computer and a mobile device in the form of a smartphone in a testing system according to embodiments.

FIG. 4 shows block diagram of components of a test computer 450 and a smartphone 410 (an example of a mobile device) in a testing system 400 according to embodiments. The smartphone 410 and the test computer 450 can be in communication via a Wi-Fi router 430 or any other suitable network-based communication element. The Wi-Fi router 430 can route messages between the smartphone 410 and the test computer 450 using a protocol such as TCP/IP.

An NFC card 422 and a contactless probe 464 are shown in dotted lines to illustrate how they might interact with a conventional smartphone that is to be tested. As explained above, in a conventional system, one or many NFC cards 422 would be tapped against the NFC hardware in the smartphone in order to test software on the smartphone. In another example, a contactless probe 464 that is part of a test machine might be tapped against the NFC hardware in the smartphone. As noted above, the use of such additional devices to test the smartphone is particularly burdensome. Embodiments of the invention do not need to use the NFC card 422 or the contactless probe 464 to test a kernel in an application on a mobile device such as a smartphone.

The smartphone 410 can comprise an interaction application 412, which can be tap-to-phone application. The interaction application 412 can include code for causing the smartphone 410 to receive data from and transmit data (e.g., via the NFC hardware 420 and the NFC API 418) to an external device such as an external card. The interaction application 412 can include and/or communicate with a virtual card 414, a kernel 416, an NFC API 418, and NFC HW (hardware) 420. As noted above, the virtual card 414 can be a virtual portable device and may emulate functionality of a real portable device. For example, the virtual card 414 can emulate the functionality of a payment card.

The kernel 416 can be a contactless kernel and can include that can cause the smartphone 410 to generate and provide certain interaction output messages in response to receiving certain interaction input messages. In some embodiments, the kernel 416 can produce at least the following types of messages, which will be provided to a contactless portable device such as an access card: a) an available application request (e.g., which requests available applications on a portable device), an application selection (e.g., which selects a particular application on a portable device), a terminal transaction data response (e.g., which includes data about the smartphone 410 or data about the interaction conducted by the smartphone 410), and an account data request (e.g., which requests account data from an external portable device). Any of the data in these messages may be examples of second data. The kernel 416 can also receive or cause the smartphone 410 to process at least the following types of messages from a contactless portable device: an available applications response (e.g., a message that indicates the applications that are present on the portable device), a terminal transaction data request (e.g., a message that requests data about the smartphone or the current interaction), a transaction processing information request, and an account data response (e.g., a message that includes account data or other data from the portable device). Any of the data in these messages may be examples of first data. Note that the use of the terms "first" and "second" do not indicate any particular order, but is intended to identify different sets of data.

The test computer 450 can also comprise a socket server 452 coupled to a virtual reader 454. The socket server 452 can be configured to receive and transmit information to and from the virtual card 414 of the smartphone 410. For example, the socket server 452 can provide interaction input messages to and interaction output messages from the virtual card 414 in the smartphone 410. The virtual reader 454 can, for example, coordinate and/or convert the interaction input messages and interaction output messages between the test tool 456 and the socket server 452.

The test tool 456 can include functionality that performs tests (e.g., test interactions). The test tool 456 can comprise a test engine 458, which can process the messages, and a plurality of test plans 460. The plurality of test plans 460 can include test plans that describe a test interaction. For example, a test plan can include a number of messages that the smartphone 410 should be transmitting to the test computer 450 in response to requests from the test computer 560. For example, the test engine 458 can generate an interaction input message comprising first data, and can provide it to the virtual reader 454 in a first format (e.g., an ISO14443 or ISO7816 message) that would be compatible with an NFC type transaction. The first data may also be in the form of APDUs. An example of first data might be data associated with a request for transaction data such as a transaction amount. The virtual reader 454 could then convert the received interaction input message to a message that is in a second format that is compatible for a TCP/IP message, and can then send the message to the virtual card 414 via the socket server 452 and the WiFi router 430. The virtual card 414 can then convert the TCP/IP message to the first format that simulates an NFC communication, and may then pass the interaction input message to the kernel 416. In some cases, the first data is again in the form of APDUs as it passes from the virtual card 414 to the kernel 416.

After the kernel 416 receives the interaction input message with the first data, the kernel 416 may then process the first data and may then generate an interaction output message with second data. The second data might include data associated with a transaction amount. The interaction output message may be in the first format (e.g., an ISO14443 or ISO7816 message) suitable for an NFC communication. The interaction output message may then be transmitted to the virtual card 414, where it can be converted to the second message format that is compatible with a TCP/IP message. The interaction output message in the TCP/IP message format may then be transmitted by the smartphone 410 to the virtual reader 454 of the test computer 450 over a network based communication channel (e.g., via the WiFi Router 430). The reader 454 may then convert the TCP/IP message to the first message format suitable for an NFC transmission, and may then send the converted interaction output message to the test engine 458 for evaluation. The received interaction output message includes the second data and the test engine 456 determines if the second data in the interaction output message is consistent with the test plan. For example, if the second data that was received was a transaction amount, and the expected data in the plan was a transaction amount, then the kernel executed the test plan successfully. The test engine 456 may also determine if the interaction output message was received in the manner expected. For example, the test engine 456 may expect to receive an interaction output message within 100 milliseconds after transmitting an interaction input message to the kernel. The test engine 456 can determine if the test was successful or unsuccessful based upon whether the interaction output message was received within the expected time period.

The test computer 450 can further comprise a plurality of test reports 462, which may be test interaction reports based on the comparisons of received messages to messages of the test plans over time. These test reports 452 may be viewed on the test computer 450 or may be exported to external devices for review.

Figure 5:
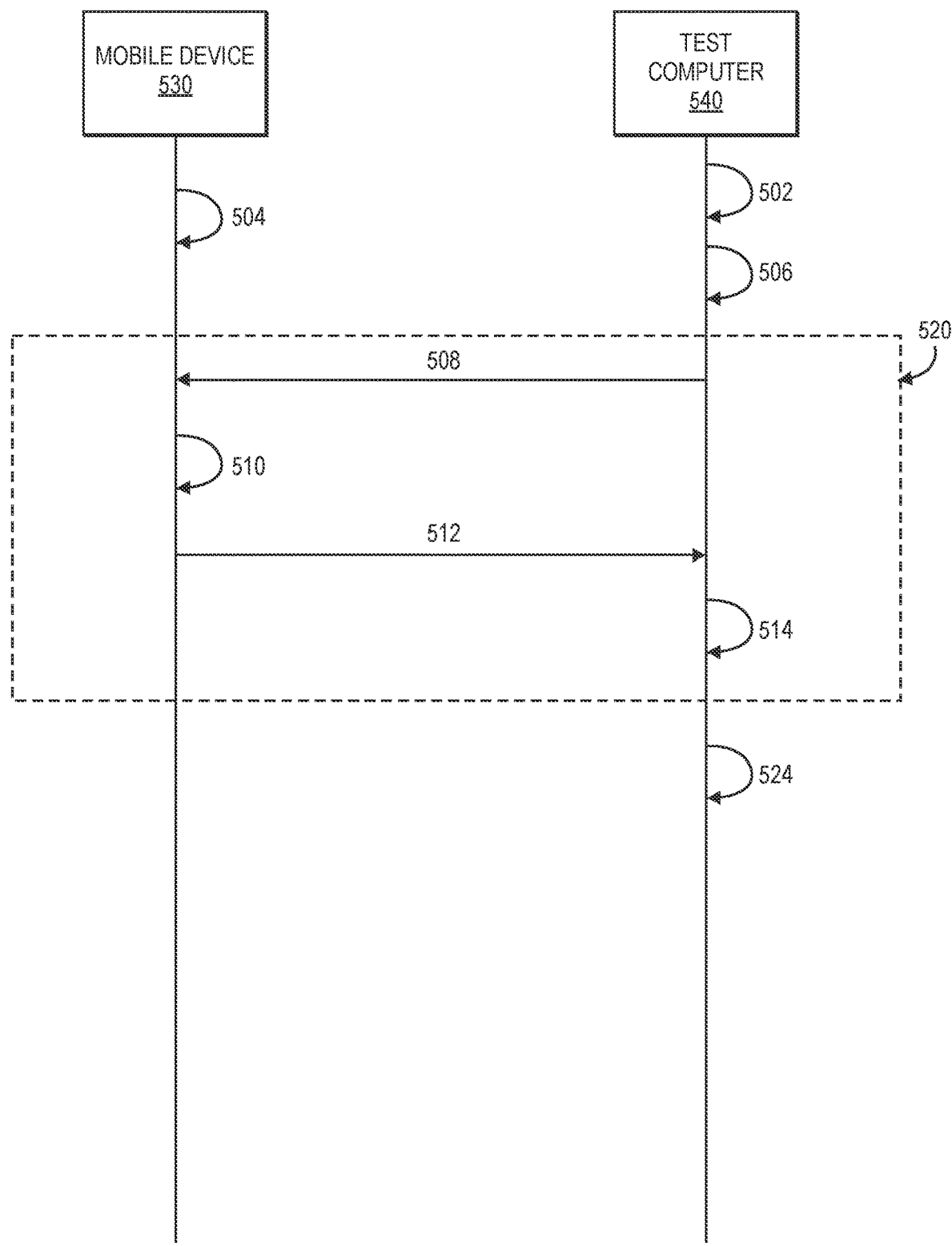
FIG. 5 shows a flow diagram illustrating a testing method according to embodiments.

FIG. 5 shows a flow diagram illustrating a testing method according to embodiments. The method illustrated in FIG. 5 will be described in the context of a test computer 540 communicating with a mobile device 530, testing one or more interaction test cases.

Prior to step 502, in some embodiments, the mobile device 530 and the test computer 540 can initialize a communications channel. For example, the mobile device 530 can connect with the interaction application to be tested to WiFi Router, assigned IP address 192.168.1.5. Further, the test computer can connect with contactless kernel test tool to WiFi Router, assigned IP address 192.168.1.6.

At step 502, the test computer 540 can launch a socket server application. For example, the test computer 540 can launch the socket server application on the test computer. The socket server then listens on its TCP/IP port (e.g., 29500), and the socket server connects to the virtual reader via a standard PC/SC API for a test APDU exchange.

At step 504, the mobile device 530 can launch an interaction application in a testing mode. For example, the mobile device 530 can launch interaction application into test mode on the smartphone, and set the remote socket server IP address and port (e.g., 192.168.1.5:29500). Instead of connecting to the smartphone's NFC hardware, the interaction application and/or its kernel connects to the socket server in the test computer 540.

At step 506, the test computer 540 can launch a test tool. In some embodiments, launching the test tool can include loading one or more test cases and connecting to a virtual reader for test APDU exchanges with the mobile device 530. For example, the test computer 540 can launch a contactless test tool on the test computer, and load a test plan to a test engine. The test engine then connects to virtual reader for an test APDU exchange, instead of connecting to physical contactless probe.

Note that the steps in FIG. 5, and in particular steps 502, 504, and 506 do not need to proceed in the order just described. For example, in some embodiments step 506 could be performed before step 504.

In some embodiments, at step 508, the test computer 540 can generate an interaction input message comprising first data and send the interaction input message to the mobile device 530. This can be in response to the test engine starting a single test case (e.g., test case 001) in the test plan. After generating the interaction input message, the test computer 540 can transmit the interaction input message to the mobile device 530. For example, the socket server of the test computer 540 can receive the APDU response in a byte array via a PC/SC API from the test engine of the test computer 540. The socket server can transmit the APDU response in a byte array stream to the interaction application via the virtual card in the mobile device 530, via a network based communication protocol such as TCP/IP.

At step 510, the mobile device 530 can receive the interaction input message from the test computer 540. For example, the kernel in the interaction application (e.g., a tap-to-phone application) on the mobile device 530 can analyze the interaction input message and the first data in the interaction input message. Responsive to this, the kernel may then generate an interaction output message comprising second data. In some embodiments, the interaction input message can be an EMV contactless payment APDU commands (e.g., AVAILABLE APPLICATIONS RESPONSE, GET PROCESSING OPTIONS COMMAND, READ RECORD RESPONSE).

At step 512, the mobile device 530 can transmit the interaction output message comprising the second data to the test computer 540. For example, the mobile device 530 can send EMV contactless payment APDU commands (e.g., SELECT, GET PROCESSING OPTIONS RESPONSE, READ RECORD COMMAND) in a byte array stream to the socket server via the virtual card in the mobile device 530 via TCP/IP, instead of sending the second data to an external portable device via an NFC API and NFC hardware in the mobile device.

At step 514, after receiving the interaction output message comprising the second data, the test computer 540 can process the interaction output message. For example, the test computer 540 can receive the interaction output message comprising the second data at a socket server. The socket server can, for example, receive an APDU command byte array, then send the APDU command to the virtual reader via PC/SC API. The test engine can then receive the APDU command from virtual reader.

The test engine can compare the second data in the interaction output message to determine if it matches an expected output. If it does not, then an error may be logged in a test report by the test engine in the test computer.

After step 514, the steps 508, 510, and 512 can be repeated with different first data and second data as shown in 520 as many times as desired to full the objectives of one or more test plans.

Once all interaction input messages have been sent to the mobile device 530 and all interaction output messages have been processed by the test computer 540, a test report 524 may be either updated or created at step 524.

Embodiments of the disclosure have a number of advantages. For example, embodiments do not require a probe or reprogrammable portable device to test an application such as an acceptance application (e.g., a tap to pay application), or a kernel therein. Embodiments provide for a network based communication between a smartphone comprising an interaction application and a test computer located in a remote location, thus eliminating the need of tapping the probe or reprogrammable portable device onto the smartphone. As a result, the time associated with testing a kernel or application on a mobile device is significantly reduced in embodiments when compared to conventional systems that require a tester to tap a portable device or probe against a mobile device to be tested. Further, as embodiments use network based communications, the mobile devices to be tested can be anywhere. The testing of mobile devices is not dependent upon the ability of humans to be proximate to the mobile devices to be tested.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   determining, by a test computer, a test plan to test a kernel on a mobile device;
   determining, by the test computer, an interaction input message according to the test plan, the interaction input message comprising first data;
   transmitting, by the test computer, the interaction input message comprising the first data to the mobile device over a network-based communication channel, wherein the kernel in the mobile device generates an interaction output message in response to receiving the interaction input message;
   receiving, by the test computer from the mobile device, the interaction output message comprising second data from the mobile device over the network-based communication channel; and
   determining, by the test computer, if the interaction output message is consistent with the test plan,
   wherein the test computer comprises a test engine, a virtual reader, and a socket server, the test engine providing the interaction input message in a first format to the virtual reader, and the virtual reader providing the interaction input message in a second format to the socket server, and
   wherein the mobile device comprises a virtual device, wherein the virtual device receives the interaction input message in the second format and provides the interaction input message in the first format to the kernel.

2. The method of claim 1, wherein the network-based communication channel is a TCP/IP (Transmission Control Protocol/Internet Protocol) communication channel.

3. The method of claim 1, determining if the interaction output message is consistent with the test plan comprises determining if the second data is expected by the test.

4. The method of claim 1, wherein the mobile device is a smartphone.

5. The method of claim 1, wherein the mobile device comprises an interaction application comprising the kernel.

6. The method of claim 1, wherein the test plan describes a test interaction.

7. The method of claim 6, wherein the test interaction is a test transaction.

8. The method of claim 1, wherein the first data is in the form of APDUs (Application Protocol Data Units).

9. The method of claim 1, wherein the virtual device is a virtual payment card.

10. The method of claim 9, wherein the virtual reader simulates functions of an access terminal.

11. A test computer comprising:
    a processor; and
    a computer readable medium coupled to the processor, the computer readable medium comprising instructions executable by the processor, to cause the test computer to:
    determine a test plan to test a kernel on a mobile device;
    determine an interaction input message according to the test plan, the interaction input message comprising first data;
    transmit the interaction input message comprising the first data to the mobile device over a network-based communication channel, wherein the kernel in the mobile device generates an interaction output message in response to receiving the interaction input message;
    receive, from the mobile device, the interaction output message comprising second data from the mobile device over the network-based communication channel; and
    determine, if the interaction output message is consistent with the test plan,
    wherein the test computer comprises a test engine, a virtual reader, and a socket server, the test engine providing the interaction input message in a first format to the virtual reader, and the virtual reader providing the interaction input message in a second format to the socket server, and
    wherein the mobile device comprises a virtual device, wherein the virtual device receives the interaction input message in the second format and provides the interaction input message in the first format to the kernel.

12. The test computer of claim 11, wherein the test computer further comprises a memory comprising a plurality of test plans for testing the kernel.

13. The test computer of claim 11, wherein the network-based communication channel comprises a TCP/IP (Transmission Control Protocol/Internet Protocol) channel.

14. The test computer of claim 11, wherein the test computer further comprises a memory comprising a plurality of test reports.

15. A method comprising:
    receiving, by a mobile device comprising a kernel from a test computer, an interaction input message comprising first data over a network-based communication channel;
    generating, by the kernel in the mobile device, an interaction output message comprising second data in response to receiving the interaction input message; and
    transmitting, by the mobile device, the interaction output message to the test computer over the network-based communication channel, wherein the test computer comprises a test engine, a virtual reader, and a socket server, the test engine providing the interaction input message in a first format to the virtual reader, and the virtual reader providing the interaction input message in a second format to the socket server, and wherein the mobile device comprises a virtual device, wherein the virtual device receives the interaction input message in the second format and provides the interaction input message in the first format to the kernel.

16. The method of claim 15, wherein the mobile device comprises an interaction application comprising the kernel.

17. The method of claim 15, wherein the mobile device is a smartphone.

18. The method of claim 15, wherein the mobile device comprises NFC hardware.

19. The method of claim 15, wherein the mobile device comprises an NFC API between the kernel and NFC hardware.

20. The method of claim 15, wherein the network-based communication channel is a TCP/IP (Transmission Control Protocol/Internet Protocol) based communication channel.

* * * * *